June 19, 1945. K. B. W. KIEL 2,378,560
SELECTING MECHANISM FOR CALCULATING MACHINES
Filed Sept. 4, 1940  2 Sheets-Sheet 2
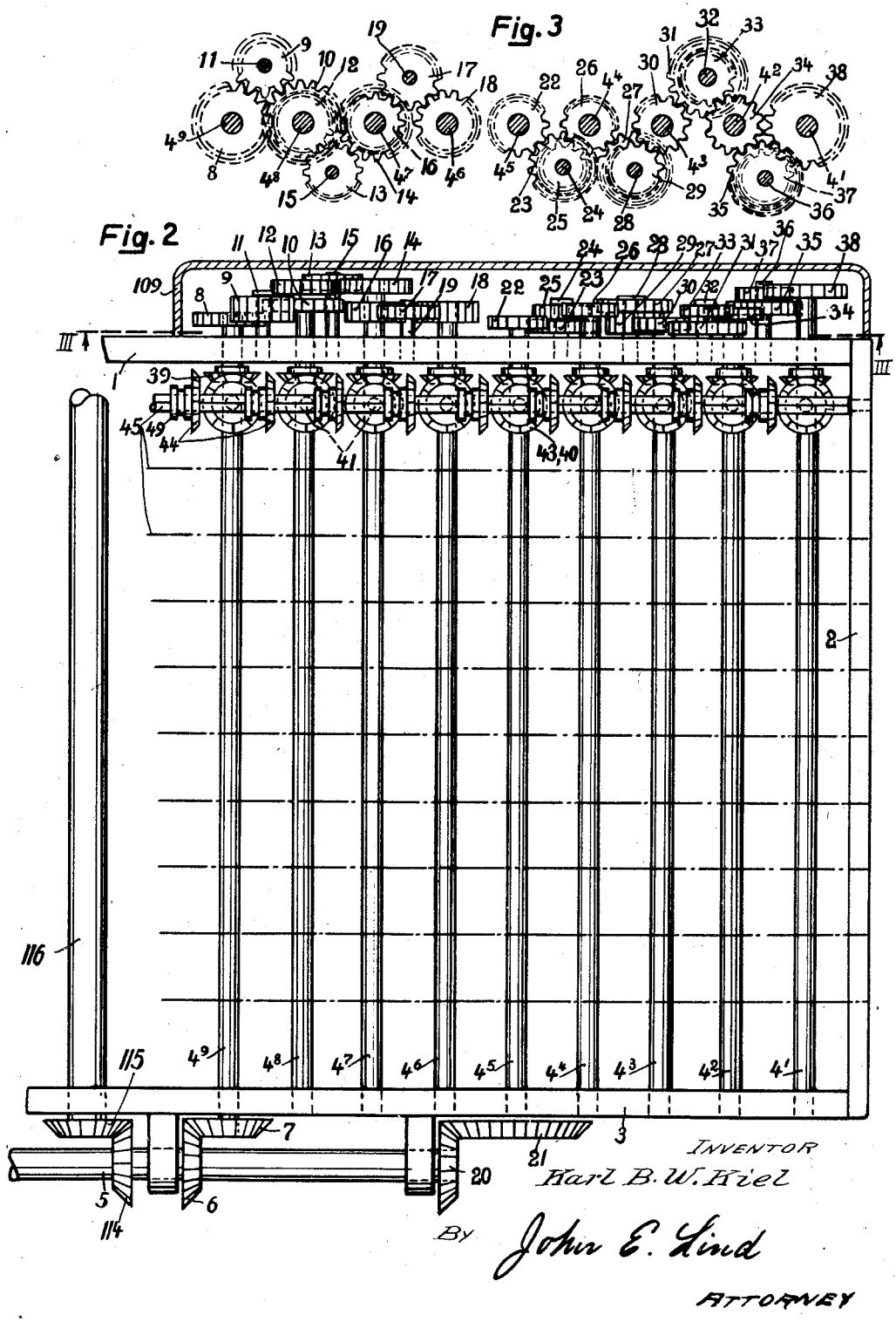
INVENTOR
Karl B. W. Kiel
By John E. Lind
ATTORNEY Patented June 19, 1945

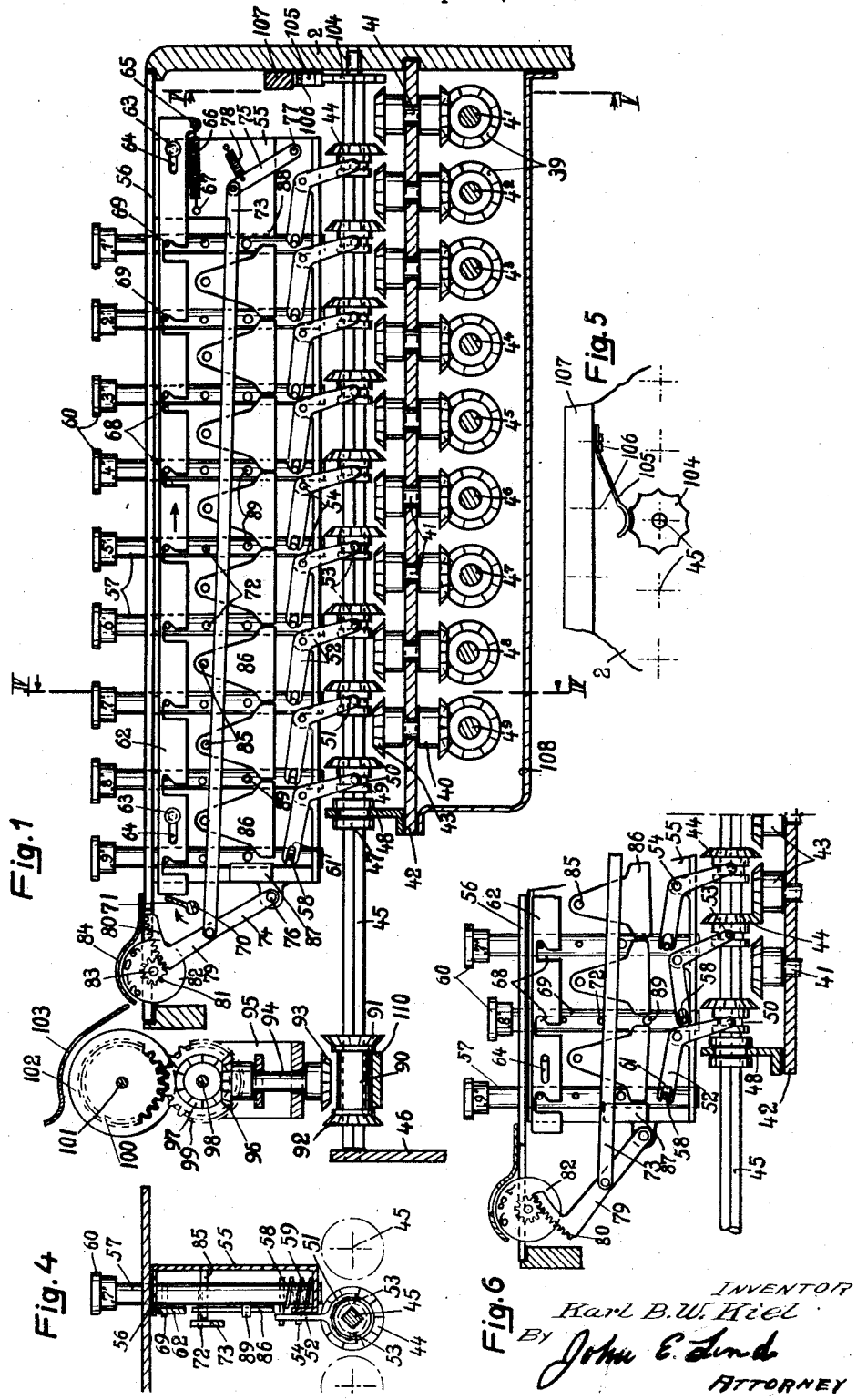

2,378,560

UNITED STATES PATENT OFFICE 2,378,560

SELECTING MECHANISM FOR CALCULATING MACHINES

Karl Berthold Wilhelm Kiel, Glashutte, Germany; vested in the Alien Property Custodian Application September 4, 1940, Serial No. 355,383
In Germany August 12, 1939

4 Claims. (Cl. 235—79)

This invention relates to a new and improved selecting mechanism for calculating machines to facilitate the performance of problems in multiplication and division.

It is an object of the invention to provide a simplified gear mechanism for the selecting operation in order to make the operation of the calculating machine quieter and avoid the knocking noises, especially during rapid calculation speeds, noticeable in certain types of machines, as, for example, the Odhner and Thomas types.

A further object of the invention is to provide the totalizer actuator shafts with gearing shiftable by the keys into mesh with coordinated gearing driven by the main calculating shaft and such coordinated gearing is arranged so as to rotate during a machine cycle in direct proportion to the key value.

It is a further object to provide the above mentioned coordinated gearing upon shafts which are driven from other shafts extending transversely of the machine. There is one of such latter shafts for each transverse row of keys. In the usual type of machine having nine keys in each bank there will therefore be nine of these latter shafts and they will have a rotation ratio with respect to one another as 1:2:3:4:5:6:7:8:9 in correspondence with the keys respectively having the values from "1" to "9."

With the above and other objects in view which will appear from the detailed description below, the invention, in a preferred form which is not to be interpreted in a limiting sense, is shown in the drawings, in which:

Fig. 1 is a partial cross sectional view from front to rear through a calculating machine illustrating particularly the selecting mechanism according to the invention.

Fig. 2 is a top plan view, partly diagrammatic for greater clarity and also with the keyboard, keys and associated parts removed, illustrating particularly the drive gearing of the selecting mechanism.

Fig. 3 is a sectional view taken on section line III—III of Fig. 2, with the casing removed, showing the cooperating gears for securing the proper rotation ratios for the drive gearing.

Fig. 4 is a partial sectional view taken on section line IV—IV of Fig. 1.

Fig. 5 is a partial sectional view taken on section line V—V of Fig. 1, and

Fig. 6 is a fragmentary view of a portion of Fig. 1 showing the position taken by certain elements upon depression of the "8" key.

The frame of the machine includes the two side walls 1 and 3 and the front wall 2. In the two side walls are located a series of parallel value shafts $4^1$, $4^2$, $4^3$, ... $4^9$. These value shafts are so driven that they revolve in the ratio of 1:2:3:4:5:6:7:8:9. Thus while shaft $4^1$ makes one revolution, value shaft $4^2$ makes two and value shaft $4^9$, for example, nine revolutions. These value shafts are driven from the main shaft 5 (Fig. 2), which makes a complete revolution for each computation.

The main shaft 5 is driven from the main gear shaft 116 which extends transversely across the machine, by means of similar bevel gears 114 and 115. The main gear shaft 116 is driven by a driving motor in any desired manner. For example, the main gear shaft 116 can be connected with the drive of the machine as described in the patent to U. Eichler No. 2,215,263 granted September 17, 1940.

The main shaft 5 is connected with value shaft $4^9$ by means of a pair of bevel gears 6 and 7, which, in view of the fact that the bevel gears 6 and 7 possess the same number of teeth (in the present form 15 teeth each), turn with the same number of revolutions as shaft 5. At the other end of shaft $4^9$ a spur gear 8 is fixed, which meshes with an intermediate gear 9 which in turn meshes with spur gear 10 fast on the right hand end of the value shaft $4^8$. The intermediate gear 9 is mounted on a stud 11 fastened on the side wall 1 of the frame. Inasmuch as the spur gear 8 in the present form has sixteen teeth and the spur gear 10 eighteen teeth, the relation of revolutions between the two shafts $4^9$ and $4^8$ is 9:8, so that while value shaft $4^9$ executes a full revolution, value shaft $4^8$ makes only 8/9 of a revolution.

Beside the spur gear 10 another spur gear 12 is located on value shaft $4^8$, which, through an intermediate gear 13, rotates a spur gear 14 fastened on value shaft $4^7$, the spur gear 13 being freely mounted on a stud 15 which is secured to the side wall 1 of the frame.

The teeth of the spur gears 12 and 14 are in the proportion of 7:8, with the result that while value shaft $4^9$ executes a complete revolution, value shaft $4^7$ executes 7/9 of a revolution. On value shaft $4^7$ is located, moreover, a spur gear 16, which meshes with an intermediate gear 17 which in turn meshes with a spur gear 18 secured to value shaft $4^6$. The intermediate gear 17 is freely mounted on a stud 19 which is fastened on the side wall 1 of the frame. Inasmuch as the number of teeth of the spur gears 16 and 18 is in the proportion of 12:14, value shaft $4^6$ executes 5/9 of a revolution while value shaft $4^9$ executes a complete revolution.

It is easily understood that the proportional rotation of value shaft $4^5$ could be effected by a proper series of gears between the value shafts $4^6$ and $4^5$. However, in order to avoid an injurious play of teeth, and undesired lost motion, the value shaft $4^5$ is driven directly from the main shaft 5, that is, by means of the bevel gears 20 and 21. The ratio of the teeth on the two bevel gears 20 and 21 is 5:9 (the bevel gear 20 has in the present form fifteen teeth and gear 21 twenty seven teeth). Therefore, while shaft 5 or $4^9$, respectively, executes a complete revolution, value shaft $4^5$ executes only 5/9 of a revolution.

At the free end of value shaft $4^5$ is fixed a spur gear 22 which meshes with a spur gear 23. The spur gear 23 is freely mounted on a stud 24 fastened on the side wall 1 of the frame, said spur gear 23 being connected with a spur gear 25 journalled on the same stud 24. The spur gear 25 meshes with another spur gear 26 fastened on value shaft $4^4$. The ratio between the gears 22, 23, 25 and 26 is such that the revolution of value shafts $4^5$ and $4^4$ is in the proportion of 5:4. In the present form this is effected by giving spur gear 22, twelve teeth, spur gear 23, fifteen teeth and to spur gears 25 and 26 twelve teeth each. Thus shaft $4^4$ will execute 4/9 of a revolution during a complete revolution of value shaft $4^9$.

Spur gear 26 on value shaft $4^4$ meshes with another spur gear 27 which is freely mounted on a stud 28 which is fastened on the side wall 1 of the frame. With spur gear 27 there is connected another spur gear 29 which meshes with spur gear 30 which is on value shaft $4^3$. The ratio between the spur gears 26, 27, 29 and 30 is so determined, that the ratio of revolutions of value shafts $4^4$ and $4^3$ is 4:3. For this purpose spur gear 27 has sixteen teeth and the spur gears 29 and 30, twelve teeth each in the present form. During a complete revolution of value $4^9$ value shaft $4^3$ will execute 3/9 of a revolution.

Spur gear 30 meshes with a spur gear 31 freely mounted on a stud 32, fastened on the side wall 1 of the frame. With spur gear 31 is connected another spur gear 33, which meshes with a spur gear 34, fastened on value shaft $4^2$. The number of teeth of the spur gears 30, 31, 33 and 34 is so determined that the ratio between the revolutions of value shafts $4^3$ and $4^2$ is 3:2. For this purpose, spur gear 31 has eighteen teeth and the spur gears 33 and 34, twelve teeth each in the present illustration of the invention. While value shaft $4^9$ executes a complete revolution, value shaft $4^2$ executes only 2/9 of a revolution.

Finally, the spur gear 34 meshes with a spur gear 35 located on a stud 36 fastened on the side wall 1 of the frame. With spur gear 35 is connected a spur gear 37 which meshes with a spur gear 38, mounted on value shaft $4^1$. Inasmuch as spur gear 35 in the present form has sixteen teeth, spur gear 37 twelve teeth and spur gear 38 eighteen teeth, the ratio between the revolutions of shafts $4^2$ and $4^1$ is 2:1. During a complete revolution of shaft $4^9$, shaft $4^1$ executes only 1/9 of a revolution.

On each of the value shafts $4^1$, $4^2$, $4^3$, . . . $4^9$ there are fastened at equal spaces from one another bevel gears 39 corresponding in number to the number of banks or denominational rows of keys. In the present illustration of the invention 10 banks or denominational rows of keys have been provided for and in accordance therewith there are arranged on each value shaft $4^1$, $4^2$, $4^3$, . . . $4^9$, ten bevel gears 39. These bevel gears 39 which in the present illustrated form of the invention have nine teeth, mesh each with a bevel gear 40. The bevel gears 40 are fastened to the lower ends of vertically arranged stub shafts 41 mounted in the frame plate 42. As may be seen from Fig. 1, similar bevel gears 43 are fastened on the upper ends of the vertical stub shafts 41. These vertical stub shafts are arranged in parallel rows, there being in the present illustration, ninety of such vertical stub shafts arranged in the horizontal partition plate 42 in ten denominational rows from front to rear of the machine.

A horizontal set of totalizer actuator shafts 45 located in a plane above the rows of bevel gears 43, carry the bevel gears 44 which are arranged non-rotatably but slidably on the square cross sectional totalizer actuator shafts 45 of the calculating mechanism for engagement with and disengagement from their respective bevel gears 43. Inasmuch as in the present disclosure, a calculating machine with a 10-bank selecting mechanism is provided, there are consequently, ten of these actuator shafts 45 in the calculating mechanism. In Fig. 2 only one of them has been shown while the other nine are indicated diagrammatically by the dot and dash lines. On each actuator shaft 45 of the calculating mechanism there are arranged nine bevel gears 44 coordinated with the nine bevel gears 43. The actuator shafts of the calculating mechanism are journalled partly in the front wall 2 of the frame and partly in the frame plate 46. In order to prevent bending of the actuator shafts 45 of the calculating mechanism, they are furnished with bearing sleeves 47 journalled in the frame plate 48.

Each bevel gear 44 is furnished with a collar 49 having an annular groove 50 in which the pins 53 on the forked ends 51 of its associated elbow lever 52 engage. The levers 52 are pivoted at 54 on their denominational frame plates 55. Corresponding to the ten actuator shafts there are provided ten banks of keys. Each bank has a U-shaped frame plate 55, which is fastened on a strip-like cover plate 56. In each bank of keys, there are nine key stems 57 arranged to slide axially, each being furnished with a radially projecting pin 58. A compression spring 59 (Fig. 4) bears at one end against this pin while the other end rests on the lower horizontal portion of the frame 55. These springs 59 tend to hold the key stems 57 in their initial upper positions and the upper ends of the stems are furnished with the key tops 60. The pins 58 engage the forked ends 61 of the elbow levers 52, so that when a key is depressed the bevel gear 44 coordinated therewith meshes with the gear 43 designed to cooperate therewith.

In order to maintain the key in depressed position, each bank of keys is provided with a locking bar 62 slidably mounted on the frame 55 of each bank of keys by means of the fastening screws 63 extending through appropriate slots 64 in the bar 62. A spring 66 is secured to each bar 62 at 65 at the right hand end as seen in Fig. 1 while the other end of the spring is fastened to the frame of the bank of keys at 67.

Bar 62 is provided with a series of spaced cam slots 68 having the shape shown on Figs. 1 and 6. A pin 69 provided on each key stem 57 extends into the cam slot 68 associated therewith. Now when a key is depressed, the corresponding key locking bar 62 is moved against the tension of its spring 66 by the action of the pin wiping along the edge of the cam slot 68. As soon as the pin 69 of the actuated key has cleared the lower open end of the cam slot 68, the key locking bar 62 returns to its initial position under the force of its spring 66 and is positioned over the pin 69 of the depressed key to lock such key so that it is maintained in depressed position. Obviously the key locking bar 62, when shifted to enable a key pin 69 to escape from its cam slot 68, is in position to release any key 57, 60 previously and inadvertently depressed in that denominational row. As a result and by virtue of the depression of a numeral key 57, 60, the associated, normally disengaged bevel gear 44 is slid along its actuator shaft 45 into mesh with its corresponding bevel gear 43. In Fig. 6 the "8" key is shown in depressed position.

The same Fig. shows the corresponding bevel gear 44 on the corresponding actuator shaft 45 of the calculating mechanism in mesh with the bevel gear 43 which is driven by shaft 4⁸.

By locking the key in depressed position, the bevel gear 44 is retained engaged with its gear 43 on the particular vertical shaft 41 pertinent to the particular key depressed.

The clearance of the keyboard can be effected by rotation of the shaft 70 which carries a wing 71 extending transversely of the machine across the rear ends of all the key locking bars 62, so that by turning the shaft 70, in the direction of the arrow shown in Fig. 1, all the key locking bars 62 are shifted to clearance position.

The device for indicating the value set up in the keyboard may be made in a great many ways. In the present illustrated form, a pin 72 projects from each key stem 57 into the field of movement of an inclined differential bar 73 for each bank of keys. Each differential bar 73 is pivotally connected to two parallel inclined supporting links 74 and 75 which in turn are pivotally connected at 76 and 77, respectively, to the frame 55. A draw spring 78 acting on the links 75 tends to hold the differential bar 73 in the initial position shown in Fig. 1. Link 74 carries by means of an extension 79 a toothed segment 80, which meshes with the small pinion 81 of a numeral indicator drum 82 mounted on shaft 83. The value of a key depressed may be read in the sight window 84 since, as is obvious, the differential bar 73 will cause the segment 80 and consequently the numeral indicator drum 82 to move proportionately to the value of the key depressed.

In order to avoid disturbances and damage in the operation of the machine on pressing down two keys of the same bank of keys, the following arrangement is provided.

A substantially triangular shaped locking plate 86 is pivoted at 85 between each two adjacent key stems 57 of a denominational row of keys, so that the opposite basal angles of the locking plates 86 contact the basal angles of the adjacent locking plates, as shown in Figs. 1 and 6. The locking plates 86 assume normally the position shown in Fig. 1, with a space between the end plates and the abutment 87 and 88 provided at opposite ends of the series of locking plates. The space at each end added together corresponds substantially to the diameter of a stud 89 provided on each key stem 57. Now, if any key is depressed, the stud 89 thereon, as can be seen from Fig. 6, will enter between the plates which lie in its path of travel and cause the plates 86 on each side to form a closed row without gaps, thereby preventing actuation of another key in the same bank. On the other hand, if two keys should be pressed at the same time by mistake, the free space between the plates 86 would not permit two studs 89 to enter at the same time between the locking plates. Thus the operator would be forced to release the key pressed down with the other by mistake, so that the desired setting can take place.

It must be mentioned, also, that in the present illustration of the invention, the bevel gears 40 and 43, as well as the bevel gears 39 have each nine teeth while the shiftable gears 44 have ten teeth.

On each actuator shaft 45 of the calculating mechanism, a gear sleeve 90 is slidably but non-rotatively mounted and carries at its opposite ends the bevel gears 91 and 92. These bevel gears 91 and 92 each have ten teeth like the cooperating bevel gear 93. The bevel gears 93 are fixed on the lower ends of vertically arranged transmission shafts 94 which are located in the carriage of the calculating mechanism. Only the subframe 95 of the carriage is shown. Each of the vertical transmission shafts 94 is provided at its upper end with a bevel gear 96 which meshes with a bevel gear 97 having the same number of teeth. The gear 97 turns freely on a shaft 98 mounted in and extending longitudinally through the carriage of the calculating mechanism. The gear 97 is connected with a spur gear 99 which meshes with spur gear 100 freely rotatable on a numeral wheel shaft 101 mounted in the carriage of the calculating mechanism and parallel with the shaft 98. The spur gear 100 acts by means of a planet gear mechanism, not shown, on its associated numeral wheel 102. The movement of the planet gear takes care of the tens transfer and this mechanism can be arranged as described, for example, in British Patent 450,599.

The gear sleeves 90 are longitudinally shifted by the shift bar 110 which is actuated in well known manner. In Fig. 1 the sleeves 90 and their reversing bevel gears 91, 92 are shown in their neutral positions, wherein no motion will be transmitted to the numeral wheels 102. During the various calculations, whether addition, subtraction, multiplication, or division, as the case may be, the shift bar 110 will bring the gears 91 or the gears 92 into mesh with the gears 93.

The operation is believed to be clear without further explanation. If, for example, as shown in Fig. 6, the "8" key is depressed in a bank of keys, the associated gear 44 is meshed with its cooperating gear 43. Such gear 43 is driven from the shaft 4⁸ through the appropriate, constantly meshed gears 40 and 39. In accordance with the explanation set forth above, the shaft 4⁸ would execute 8/9 of a revolution in each cycle of the machine, i. e., with each complete rotation of the main shaft 5. This means that the corresponding gear 43 rotates the gear 44 eight teeth at each cycle, so that actuator shaft 45 makes 8/10 of a revolution. Let us assume that the multiplier is "4," then the actuator shaft 45 is rotated 3.2 times while the main shaft executes four cycles. This means that the numeral wheel 102 is turned 3.2 times through the medium of gears 91, 93, 96, 97, 99 and 100, so that in the units sight window 103 a "2" will show while the numeral wheel 102 of the next higher decimal position will show a "3" in its sight window which is taken care of by the tens transfer mechanism.

In order to insure that the actuator shafts 45 do not turn because of vibrations and the like, a stop disk 104 is provided on each shaft 45, which, as shown in Fig. 5, is provided on its periphery with ten indentures with which a leaf spring 105 cooperates. The leaf springs 105 are secured at 106 to a bar 107 mounted on the frame.

The gears which are in constant mesh are encased in oil for permanent lubrication and the oil-tight casings 108 and 109 are provided for this purpose. Due to the peculiar construction provided, the main gearing elements may be located within the oil-tight casings.

I claim:

1. In a calculating machine of the full keyboard type, including a row of keys for each denomination; and a totalizer, including a totalizer wheel for each denominational row of keys; an actuator shaft individual to each row of keys to differentially drive the corresponding totalizer wheel; and an ordinal series of gears slidably mounted on each actuator shaft under control of their respective keys: a series of value shafts extending transversely to the series of actuator shafts, and individual to the transverse rows of keys of corresponding value in the several denominational rows; a series of gears on each value shaft corresponding in number with the number of keys of like value in the respective denominational rows of keys; transmission means individual to, and engaged with, each of the gears on the several value shafts, said actuator shaft gears normally being disengaged from said individual transmission means; a power shaft to drive the value shafts; and proportional gearing connecting adjacent value shafts at one end to impart rotations of proportional differences to the successive value shafts according to the particular notational system for which the machine is designed.

2. In a calculating machine of the full keyboard type, including a row of keys for each denomination; and a totalizer, including a totalizer wheel for each denominational row of keys; an actuator shaft individual to each row of keys to differentially drive the corresponding totalizer wheel; and an ordinal series of gears slidably mounted on each actuator shaft under control of their respective keys; a series of value shafts extending transversely to the series of actuator shafts, and individual to the transverse rows of keys of corresponding value in the several denominational rows; a series of gears on each value shaft corresponding in number with the number of keys of like value in the respective denominational rows of keys; transmission means individual to and engaged with each of the gears on the several value shafts, said actuator shaft gears normally disengaged from said individual transmission means, the plurality of value shafts comprising two groups; a power shaft; gears of different and predetermined ratios interposed between the power shaft and the first shaft of each said group of value shafts to impart rotations of different angular extents to said first shafts according to the particular rotational system for which the machine is designed; and proportional gearing connecting said first shafts of each group of value shafts with their next adjacent shafts, respectively, and between such next adjacent shafts and their respective successive shafts to impart to said adjacent and successive shafts progressively different extents of rotation proportional to those imparted by the power shaft to said first shafts, respectively, of the groups of value shafts.

3. In a calculating machine of the full key board type, including a row of depressible keys for each denomination; a totalizer, including a totalizer wheel corresponding with each denominational row of keys, and a series of horizontally arranged actuator shafts individually associated with the respective totalizer wheels and corresponding denominational rows of keys, and extending from front to rear of the machine: a horizontally arranged series of value shafts located in a plane beneath and extending transversely to the series of actuator shafts, the respective value shafts associated with the keys of corresponding value in the several denominational rows; a series of gears on each value shaft corresponding in number with the number of keys of like value in the respective denominational rows of keys; a series of gears on each actuator shaft, the gears of each last mentioned series being individual to the keys of the corresponding denominational rows; individual transmission means between the corresponding gears of the respective series of shafts, and engaged with one of said gear series; the gears on the other of said series of shafts being bodily shiftable relatively to the gears on the said one series of shafts, under control of the keys, for engagement with, and disengagement from, said individual transmission means; a power shaft to drive a value shaft; and proportional gearing connecting adjacent value shafts to drive the successive value shafts from highest to lowest value proportional extents in accordance with the particular notational system for which the machine is designed.

4. In a calculating machine of the full keyboard type, including a plurality of denominational rows of numeral keys; a series of totalizer wheels, there being one totalizer wheel appertinent to each denominational row of keys; a series of parallel actuator shafts, one shaft for each denominational row of keys and its totalizer wheel; means operable by the actuator shafts to turn their totalizer wheels; and normally idle gears of like pitch mounted on each actuator shaft and individually shiftable along their shafts by the respective keys of their corresponding denominational rows: a set of parallel value shafts extending transversely to the series of actuator shafts; gears of like pitch fast on the respective value shafts, there being one such gear for each key of the keyboard; individual transmission means engaged with the respective value shaft gears, and engageable by the shiftable key-controlled gears; separate sets of proportional gears connecting the adjacent value shafts to impart to the value shafts rotations of different angular extents corresponding to the digit values represented by the respective value shafts, the angular extents of rotations being constant as to each such value shaft; and a power shaft to impart one complete rotation to one of the value shafts in the series at each machine operation.

KARL BERTHOLD WILHELM KIEL.